United States Patent [19]
Ritter et al.

[11] 3,936,628
[45] Feb. 3, 1976

[54] AN APPARATUS FOR FORMING ELONGATE REINFORCING ELEMENTS

[75] Inventors: Gerhard Ritter; Josef Ritter; Klaus Ritter; Wilhelm Boyer; Hans Gött, all of Graz, Austria

[73] Assignee: Evg Entwicklungsu verwertungsgesellschaft GmbH, Graz, Austria

[22] Filed: May 2, 1974

[21] Appl. No.: 466,482

[30] Foreign Application Priority Data
May 3, 1973   Austria .............................. 3895/73

[52] U.S. Cl. ................... 219/56; 214/1 B; 219/103
[51] Int. Cl.² ........................................ B23K 11/02
[58] Field of Search........... 214/1 B; 219/56, 57, 58, 219/103, 106

[56] References Cited
UNITED STATES PATENTS

| | | | |
|---|---|---|---|
| 3,487,861 | 1/1970 | Fahrenbach | 219/56 X |
| 3,699,756 | 10/1972 | Ritter et al. | 219/56 |
| 3,722,777 | 3/1973 | Ziemek et al. | 219/56 X |
| 3,838,241 | 9/1974 | Weismann | 219/58 X |

*Primary Examiner*—J. V. Truhe
*Assistant Examiner*—N. D. Herkamp
*Attorney, Agent, or Firm*—Ernest F. Marmorek

[57] ABSTRACT

The invention relates to an apparatus for forming elongate reinforcing elements having a pair of rods and transverse rungs welded perpendicularly between said rods, said rods being fed parallel to one another in stepwise fashion between the welding electrodes, and said rungs being inserted perpendicularly between said rods before welding.

9 Claims, 8 Drawing Figures

APPARATUS FOR FORMING ELONGATE REINFORCING ELEMENTS

Structural elements which consist of a pair of parallel rods and lattice welded transverse rungs and which are used chiefly for reinforcing concrete are known under the trade mark 'bi-steel'. According to a known process for manufacturing such structural elements the rods are supplied to the weld point in converging directions so that their distance apart at the weld point is greater than the required clearance of the finished pair of rods, and so that the transverse rung to be welded on is inserted in the space between the converging longitudinal bars and is retained at the weld point, whereupon the longitudinal bars are pushed on both sides towards the ends of the transverse rungs by the welding electrodes and are welded on with these rungs, preferably by multiple spot welding, the pair of bars are then being advanced.

The invention relates to a process for manufacturing structural elements which consists of a pair of parallele rods and lattice welded transverse rungs, in which the rods are fed stepwise between two interacting welding electrodes and in which a transverse rung is arranged in the vicinity of the welding electrodes between the rods and is welded between them by the welding electrodes by multiple spot welding using the electric resistance method. The invention is aimed at reducing the space required for implementing the method, by avoiding the converging feed paths of the two rods which have been usual hitherto, and thereby enabling a large number of structural elements of the type in question to be manufactured close to one another in a confined space.

According to the present invention the method comprises feeding the rods, substantially parallel to one another, in stepwise fashion between a pair of movable welding electrodes arranged to bear against the rods urging them towards one another; positioning between the rods a rung of a length just exceeding the distance between the rods and rotating the rung into a position perpendicular to the rods, thus forcing them slightly further apart; and welding the transverse rung to the rods by passing an electric current between the two electrodes.

Preferably a bar of the transverse rung material is fed parallel to the rods and individual transverse rungs are cut from the bar immediately prior to being positioned between the rods.

This process affords the further advantage, from the point of view of welding, that when the transverse rungs are rotated the rods are pushed apart by the transverse rung which, because of shortening during the welding process, must initially be longer than the desired clearance between the rods of the finished structural element. The rods are placed parallel to each other in front of and behind the welding zone when they are already in their final spacing. After welding, that is when the transverse rung has been shortened by the burning depth, the rods are therefore perfectly straight in the welding area so that they cannot exert any elastic forces on the fresh welds.

In the conventional manufacturing process, in which the rods are welded along converging paths, the mutual clearance of the rods at the weld was greater than the length of the transverse rung not yet welded in. The rods were pressed against and welded to the transverse rungs by the welding electrodes acting on them from the outside with resulting elastic deformation. When the electrodes were opened a tractive force was therefore exerted on the welds, which were still fresh, since the elastically deformed rods had the task of reversing their elastic deformation. To prevent the fresh welds from being damaged the electrodes had to remain pressed against the rods until the welds were sufficiently firm to be able to absorb the elastic forces acting on them without damage. The manufacturing speed was therefore limited.

According to a further development of the invention two or more transverse rungs are simultaneously inserted between the two rods and then simultaneously welded to the rods, the rods being fed at each step by a distance double or several times the transverse rung spacing.

The invention also enables several structural elements of the type described to be manufactured close to each other with a saving of space. For this purpose a number of pairs of parallel rods are fed simultaneously past a corresponding number of pairs of electrodes; a number of bars of material from which the transverse rungs are cut are simultaneously supplied substantially parallel to the rods in a plane parallel to that of the rods, and are then cut to length by interconnected shears perpendicular to the rods, whereupon the transverse rungs are brought simultaneously into the plane of the rods and are then rotated into position perpendicular to the rods before being welded to the rods.

The structural elements manufactured at a short mutual distance from each other can be combined in the form of a lattice for surface reinforcements or the like immediately after manufacture, the pairs of rods being arranged at a distance from each other corresponding to the required spacing of the longitudinal elements of the lattice, and welded to transverse bars containing all the pairs of rods, by means of an additional row of electrodes spaced at distances which should preferably be equal to a whole multiple of the transverse rung spacing. The process therefore permits with advantage the manufacture of linear reinforcements and surface reinforcements.

The invention also includes a machine for carrying out the method, the machine having two parallel rod guides separated by substantially the distance required in the finished element, a transverse rung carrier, for positioning a transverse rung between the rods and which is movable from a loading position outside the plane of the rods, in which it may be loaded with a transverse rung in a direction substantially parallel to the rods, and a welding position in which the transverse rung is positioned perpendicularly between the rods, a pair of welding electrodes urged into engagement with the rods; and means for feeding the rods through the machine.

Several examples of methods and machines in accordance with the invention will now be described with reference to the accompanying drawings, in which.

Figure 1:
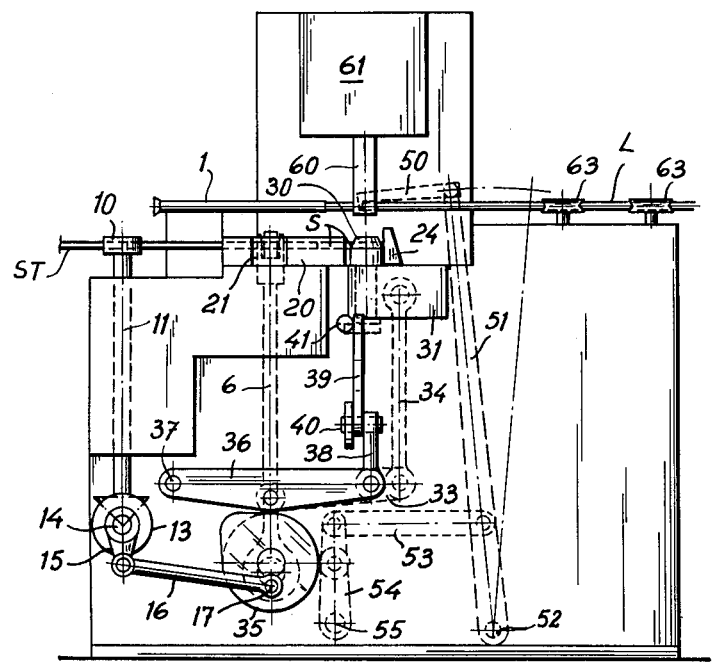
FIG. 1 is a side view of a first machine.
Figure 2:
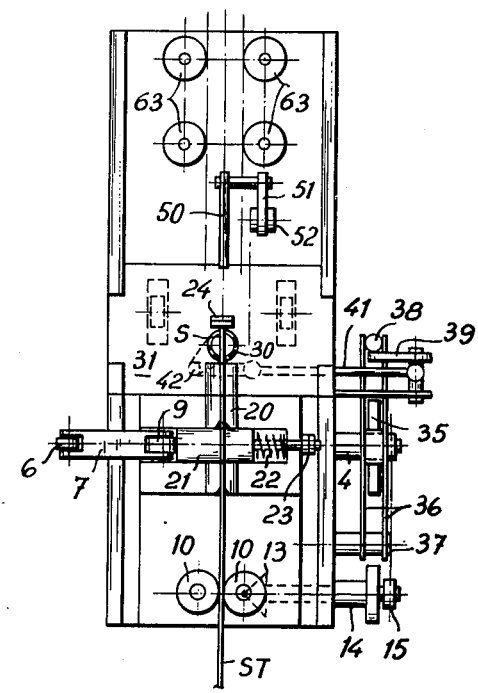
FIG. 2 is a plan view of the machine of FIG. 1 omitting the welding electrodes and the rod guides.
Figure 3:
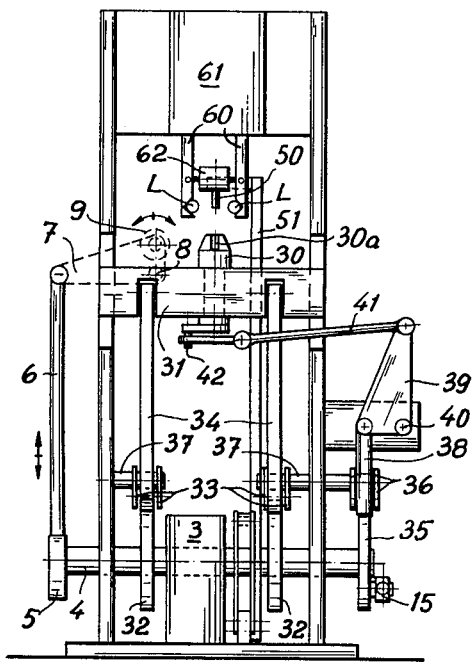
FIG. 3 is a front view of FIG. 1.

The welding machine exemplified in FIGS. 1 to 3 is provided consist two parallel rod guides parallel shown in FIG. 1, spaced so that the rods L fed into the welding machine by the guides 1 are already at the required distance apart for the finished pair of rods connected by lattice-type transverse rungs.

In parallel with the rods, but on a lower plane, is supplied a bar ST from which transverse rungs S are cut.

In a housing 3 (FIG. 3) is arranged a drive motor which drives the main shaft 4 of the welding machine. At one end of which is rigidly connected a radial cam 5, this cam actuating a bent lever formed from a triangular plate 7 and a push rod 6. This bent lever is pivoted around an axis 8. A roller 9 is pivoted at the third corner of the triangular plate 7.

The bar ST, from which transverse rungs S are cut is retained and advanced by two friction rollers 10 (FIGS. 1 and 2), one of which is rigidly mounted at the end of a shaft 11 which is in turn driven by a bevel gear 13. The second non-driven friction-roller can be supported by a known method so that it is adjustable in relation to the driven friction roller so that the pressure of the two friction rollers 10 on the bar ST can be varied.

One of the two interacting bevelled rungs of the bevel gear 13 is rigidly supported on a shaft 14 which can be displaced in stepped rotation by means of the ratchet drive (not shown) of a crank 15. The crank 15 is connected to a crank pin 17 driven by the main shaft 4, the connection being made by a connecting rod 16. By this means the shaft 14, driving the bevel gear 13, is indexed by one step for each complete revolution of main shaft 4 and bar ST is advanced by a distance which is equal to the length of one transverse rung.

On advancing the travel bar ST is pushed into a fixed transverse rung guide 20, which is provided with a recess of rectangular cross-section so that it can receive the bar ST, which also has a rectangular cross-section. A cutting slide 21, whose width is exactly equal to the length of a transverse rung, is arranged so that it normally slides on to the transverse rung guide 20 and is retained in its position of rest by a spring 22 (FIG. 2). The cutting slide 21 is also provided with a rectangular recess for receiving the bar ST, this recess lying flush with the rectangular recess of the transverse rung guide 20 when the cutting slide is in the position of rest shown in FIG. 2.

As soon as the push rod 6 is raised by the cam 5, the plate 7 performs a swivelling movement around its axis 8. In doing so the roller 9 pushes the cutting slide 21 against spring 22 and the rod ST is cut through to form a new transverse rung S, on the interfaces between the cutting slide 21 and the transverse rung guide 20 as a result of the cutting slide moving to the right. A nut 23 secured by a lock-nut enables the position of rest of cutting slide 21 to be adjusted so that the rectangular recess of the cutting slide and that of the transverse rung guide 20 may be exactly aligned. The distance of travel of the transverse rungs S is limited by a stop 24.

In the advance path of the cut transverse rung S is arranged a transverse rung carrier with a rung jack 30 which is pivoted in a rung jack platform 31 that can be raised and lowered. As is shown in FIGS. 1 and 3 the upper half of the rung jack is frusto-conical in shape. The diameter of the rung jack 30 is smaller than the length of one transverse rung so that a transverse rung which has been inserted in the rectangular recess 30a of the rung jack 30 projects from the jack surface on both sides.

By means of two radial cams 32 (FIG. 3) arranged rigidly on the main shaft of the machine, the rung jack platform 31 can be moved up and down by the levers 33 and push rods 34, the rung jack 30 being located underneath in the loading position.

A further radial cam 35 actuates a lever 36 which is pivoted on an axle 37, and which is connected to a cranked lever 39 designed as a triangular plate and pivoted around a bearing 40 by a push rod 38. At the free end of the cranked lever 39 is coupled a further push rod 41 which is linked with crank pin 42 of a crank connected rigidly to the rung jack 30 so that swivelling movement of the lever 36 around its axis 37 (initiated by the radial cam 35) produces a rotary movement of 90° of the jack 30.

The rods L are fed between electrodes 60 which are designed as pincers and which are suspended underneath the transformers 61 arranged in the upper half of the welding machine. Each two electrodes, which interact in pairs, can be moved against each other by suitable means (e.g. a pressurized cylinder 62) in order to be able to press the parts to be welded together with suitable pressure.

After welding, the structural element is advanced by a feed hook 50 (FIG. 1) which is arranged on the end of a rocker arm 51. The rocker arm 51, pivoted at 52, is actuated by a push rod 53 which is connected to the free end of a lever 54 pivoted around an axis 55, the movement of the lever 54 around its axis 55 again being initiated by a radial cam arranged on the main shaft 4. The feed hook thus actuated, grips on to the transverse rungs of the manufactured structural element. This welding machine operates as follows:

For every revolution of the main shaft 4 the bar ST is advanced one step, equal to the length of one transverse rung, by the friction rollers 10 in the manner already described. Similarly, the cutting slide 21 performs a cutting movement for every revolution of main shaft 4, so that a transverse rung S is cut off from bar ST.

The forwardmost transverse rung, whose advancing movement is limited by the stop 24, rests in the rectangular recess 30a of the rung jack 30. As soon as the rung has reached this position the rung jack platform 31 is raised from the radial cams 32 by the levers 33 and push rods 34 so that the frusto-conical end of the rung jack, whose diameter is smaller than the spacing apart of the rods L of the welded structural element, is brought to a position between the rods L retained on both sides by the electrodes 60. Of course, the width of the stop 24 must also be such that the stop can be inserted between the rods L and is able to rest between these without obstructing the welding process.

The rung jack is now turned 90° around its axis by the radial cam 35 with the aid of transfer elements 36, 38, 39, 41 and 42, so that the transverse rung (parallel to the rods in its initial position and whose length is greater than the distance apart of the rods) is jammed in between them. The transverse rung now lies at right angles to the rods and between them, the rods in the vicinity of the electrodes 60 being slightly further apart than in the vicinity of the rod guides 1 in front of the electrodes, or in the vicinity of the guide rollers 63 behind the electrodes.

After the transverse rung has been brought into the correct position between electrodes 60, pressure medium cylinder 62 is pressurized so that the electrodes 60 are pulled towards the rods L and the welding current is then switched on by known means. The rods L are in turn pushed against the ends of the transverse rung still held between them by the jack 30. Under the influence of the electric current and the pressure the transverse rung is welded at each of its ends to a rod by multiple spot welding.

When welding is completed, the jack platform 31 is lowered and as soon as the rung jack is disengaged from the transverse rung just welded the return movement of the jack 30 around its own axis is also initiated so that the rectangular recess 30a in the jack, which serves to receive a transverse rung, can again be brought into alignment with the bar ST. The lowering movement of the jack platform 31 and the return movement of the jack 30 are controlled by radial cams 32 and 35 respectively.

Figure 4:
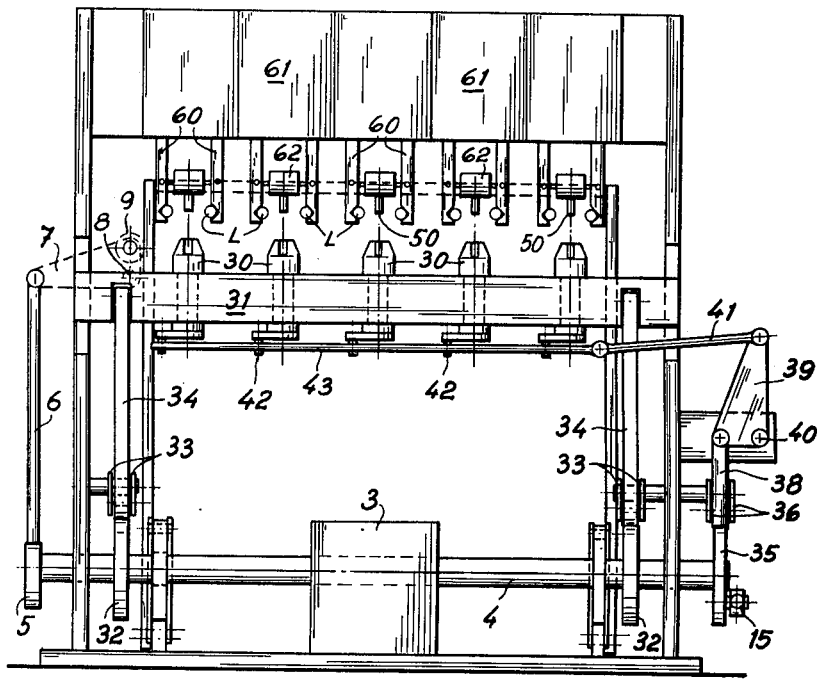
FIG. 4 is a front view similar to FIG. 3 of another machine on which five 'bi-steel' type structural elements can be manufactured next to each other.

The machine according to the invention enables a whole series of modifications to be carried out. For example, as shown in FIG. 4, a large number of welding electrodes units, in this case five, can be combined in one machine, all the rung jacks 30 being arranged in a common jack platform 31. The jack platform 31 is operated in exactly the same way as in a single machine and, similarly, the drive elements for the rotary movement of the rung jacks 30 are the same as in the single machine; they are only supplemented by a coupling rod 43 which connects the crank pins 42 on all the jacks 30 to the push rod 41.

The mechanism for cutting the transverse rungs to length also remains essentially the same as in a single machine, except that the correspondingly long cutting slides 21 must be provided with their own rectangular recess for each of the five bars ST, so that all transverse rungs can be cut to length simultaneously in a single cutting movement.

Figure 5:
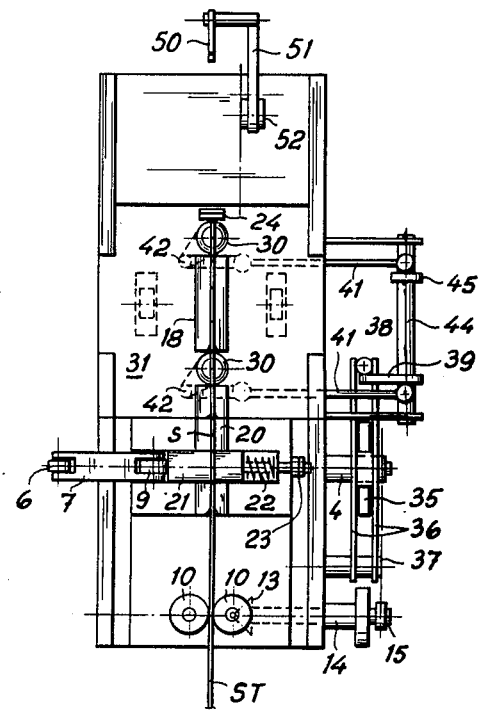
FIG. 5 shows a further machine (in plan view) in which two welding electrode units are arranged behind one another.
Figure 6:
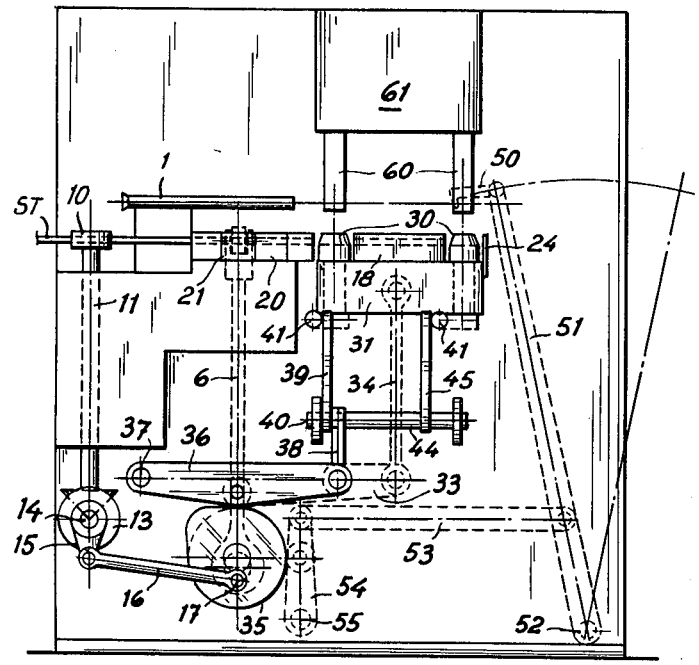
FIG. 6 is a side view of the machine of FIG. 5.

Another modification is shown in FIGS. 5 and 6. In this machine two welding electrode units 60 are arranged behind one another so that in every welding process two transverse rungs S are simultaneously welded between the rods L. A precondition for the operation of a machine so arranged is that the length of the cut, unwelded transverse rung S is a whole-number divisor of the transverse rung spacing in the finished structural element and further that the distance between the two welding electrode units arranged behind one another is equal to the transverse rung spacing or an odd multiple of the transverse rung spacing.

Structurally, the machine requires modification of the basic design shown in FIGS. 1 to 3 only insofar that the feed of bar ST from which transverse rungs S are cut, must cover a distance of two transverse rung lengths at every working stroke. Similarly the welded structural element must be advanced by feed hooks 50 in every advance step by two transverse rung lengths.

Finally a cranked lever 39 is rigidly arranged on a shaft 44 which supports a transfer lever 45 which is also rigidly connected to this shaft. The transfer lever 45 actuates the push rod 41 of the second rung jack 30. Between the two rung jacks 30 is arranged a transverse rung guide 18 which is rigidly connected to the jack platform 31 and which is also provided with a rectangular recess for guiding the cut transverse rungs between the two jacks 30.

Figure 7:
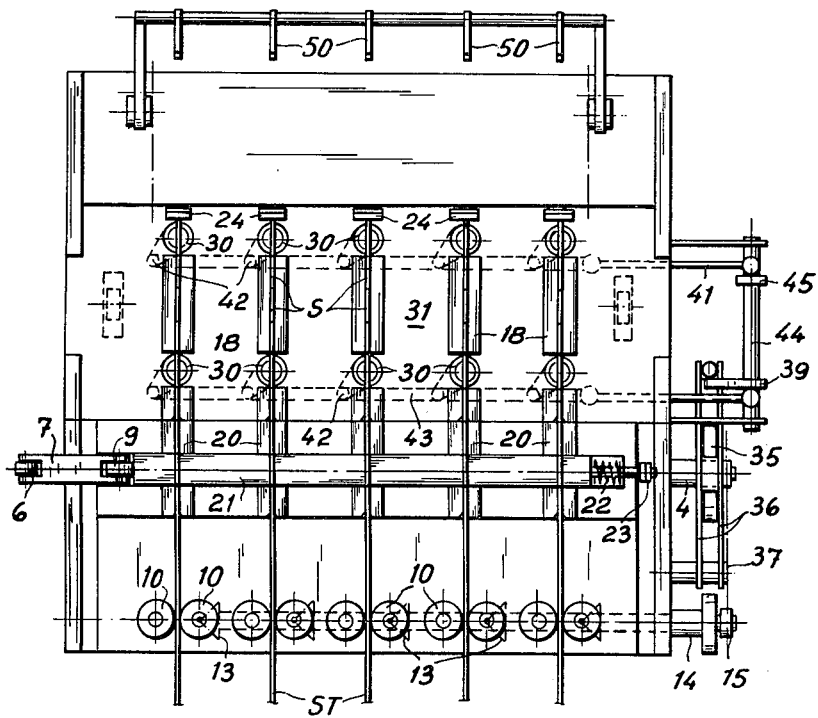
FIG. 7 is a plan view similar to FIG. 2 of a further machine in which five 'bi-steel' type structural elements are manufactured next to each other, similar to FIG. 4, but each with two welding electrode units arranged behind one another; and, FIG. 8 shows the interaction of the welding device of FIG. 6 with a lattice welding device connected in series.

FIG. 7 shows an arrangement, similar to that of FIG. 4, of a number of welding electrode units 30 combined with welding units arranged behind one another as shown in FIGS. 5 and 6.

Figure 8:
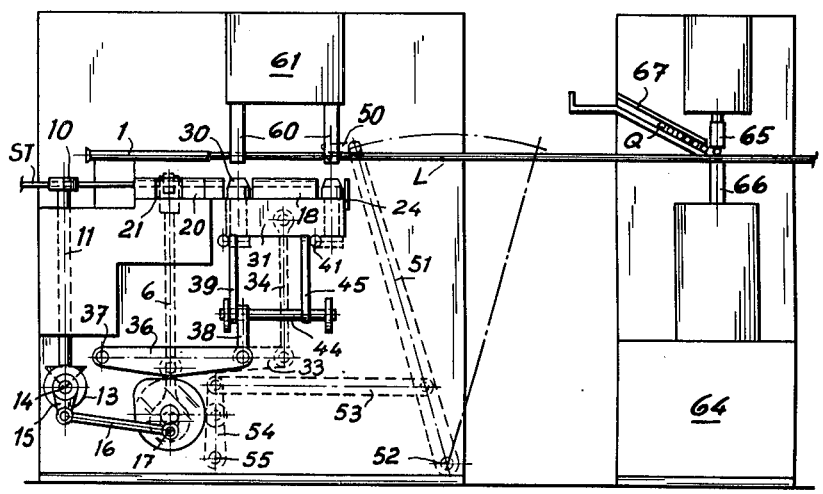

Finally, FIG. 8 shows the interaction of a welding machine according to FIGS. 6 and 7 with a device connected in series for welding transverse bars on to the large number of parallel pairs of rods with transverse rungs coming from the welding machine thereby forming a welded lattice-work.

Since the welding machine of FIGS. 6 and 7 is provided with a device for feeding the structural elements welded by it (parts 50 to 55), this is sufficient if the device generally referred to with the number 64 for welding on transverse bars Q consists only of a resistance welding device without a lattice feeding device. Since devices for welding a large number of parallel rods with transverse bars crossing them are generally known, a diagrammatic representation will suffice here, in which only the transverse bar magazine 67 and the interacting upper electrodes 65 and lower electrodes 66 can be seen.

The lattice welding device operates at the same rate as the previous welding machine. Since this welding machine welds two transverse rungs simultaneously between the rods at every working stroke and therefore also advances the structural elements produced by double the transverse rung spacing, the distance between the welded transverse bars Q of the lattice is also equal to double the distance between the transverse rungs in the pairs of rods.

Because all structural elements serving as longitudinal cords of the lattice are manufactured on one welding machine simultaneously, all the transverse rungs of these structural elements are always exactly aligned and it is therefore possible at all times to weld on the lattice transverse bars between these transverse rungs and at the same distance from them.

We claim:

1. Apparatus for manufacturing elongate reinforcing elements consisting of a pair of rods and transverse rungs welded therebetween at right angles to said rods, said apparatus comprising two parallel rod guides spaced apart by substantially the distance required in said finished elements; a transverse rung carrier positioned below the plane of said rod guides, receiving one of said transverse rungs in a direction substantially parallel to said rod guides, and movable to a welding position in which said rung is positioned between, and at right angles to, said rods; a pair of welding electrodes engageable with said rods; and means for drawing said rods through said apparatus.

2. Apparatus according to claim 1, wherein said rung carrier comprises a rung jack platform which can be raised and lowered, and a rung jack pivotally mounted on said platform, said rung jack having a free end through which is provided a recess for receiving a transverse rung.

3. Apparatus according to claim 2, wherein said jack is pivotally mounted to rotate about an axis perpendicular to the plane defined by said rod guides, for insertion of said rung between, and at right angles to, said rods.

4. Apparatus according to claim 1, further comprising means defining a feed path for transverse rung material parallel to said rod guides and, adjacent said rung carrier on said feed path cutting means intermittently actuable to cut said rung material to the required length.

5. Apparatus according to claim 1, further comprising a set of pairs of rod guides, of rung carriers and of pairs of welding electrodes, and means actuatable to operate said pairs of rung carriers and said pairs of welding electrodes in timed relation 6. Apparatus according to claim 5, wherein said rung carriers comprises a plurality of rung jacks mounted for rotation on a single rung jack platform.

7. Apparatus according to claim 5, further comprising a common cutting device for cutting said transverse rungs.

8. Apparatus according to claim 5, further comprising a second set of pairs of welding electrodes for welding transverse bars to said rods to form a lattice.

9. Apparatus according to claim 1, wherein a plurality of pairs of electrodes are provided one behind another in the direction of feed of said rods, and a plurality of said rung carriers are mounted adjacent said pairs of electrodes, and means actuatable to operate said rung carriers simultaneously.

* * * * *